US012585083B2

(12) United States Patent (10) Patent No.: US 12,585,083 B2
Ito et al. (45) Date of Patent: Mar. 24, 2026

(54) LENS APPARATUS, IMAGE PICKUP APPARATUS, METHOD OF CONTROLLING LENS APPARATUS, AND COMPUTER-READABLE STORAGE MEDIUM

(71) Applicant: CANON KABUSHIKI KAISHA, Tokyo (JP)

(72) Inventors: Shu Ito, Tochigi (JP); Toshihiro Okuda, Tochigi (JP); Kunihiko Sasaki, Tochigi (JP); Tadanori Okada, Tochigi (JP); Takehiko Sato, Tochigi (JP); Toshimune Nagano, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 544 days.

(21) Appl. No.: 18/183,786

(22) Filed: Mar. 14, 2023

(65) Prior Publication Data

US 2023/0296859 A1 Sep. 21, 2023

(30) Foreign Application Priority Data

Mar. 16, 2022 (JP) ................................. 2022-041679

(51) Int. Cl.
*G02B 7/105* (2021.01)
*G03B 3/10* (2021.01)
*G03B 13/34* (2021.01)
(52) U.S. Cl.
CPC ............... *G02B 7/105* (2013.01); *G03B 3/10* (2013.01); *G03B 13/34* (2013.01)

(58) Field of Classification Search
CPC ........... G03B 3/10; G03B 13/34; G02B 7/105
See application file for complete search history.

(56) References Cited

U.S. PATENT DOCUMENTS 5,164,756 A * 11/1992 Hirasawa ............... G02B 7/102
359/698

FOREIGN PATENT DOCUMENTS

| JP | 2000180693 A | 6/2000 |
|---|---|---|
| JP | 2008197617 A | 8/2008 |
| JP | 2012053141 A | 3/2012 |
| JP | 2017227825 A | 12/2017 |

* cited by examiner

*Primary Examiner* — Minh Q Phan
(74) *Attorney, Agent, or Firm* — Canon U.S.A., Inc. IP Division

(57) ABSTRACT

A lens apparatus includes a first holder holding a first lens unit and moving, manually or by an external driver, in an optical axis direction, a second holder holding a second lens unit and being electrically driven in the direction, a transmission member supported by the second holder to be movable in a first range in the direction relative to the second holder, a driving unit moving the second holder in the direction via the transmission member, a biasing member biasing the transmission member toward an end of the first range opposite to the first lens unit, and a controller controlling the driving unit. Movable ranges of the first and second holders in the direction overlap each other. The controller determines a relative position between the driving unit and the second holder in the direction, and changes a control of the driving unit based on the relative position.

11 Claims, 13 Drawing Sheets

LENS APPARATUS, IMAGE PICKUP APPARATUS, METHOD OF CONTROLLING LENS APPARATUS, AND COMPUTER-READABLE STORAGE MEDIUM

BACKGROUND OF THE INVENTION

Field of the Invention

The present disclosure relates to a lens apparatus, an image pickup apparatus, a control method of the lens apparatus, and a computer-readable storage medium.

Description of the Related Art

In order to shorten the shortest overall length of a zoom lens barrel, there is known a technology that allows a configuration in which a movable range of a lens unit that moves using an electric driving means and a movable range of a lens unit that moves using a manual or external driving means overlap each other. Japanese Patent Application Laid-Open No. 2008-197617 discloses a first lens unit and a first holding member which are manually moved in the optical axis direction, and a second lens unit and a second holding member which are moved via a transmission member from a driving force of a driving member. A lens barrel structure in which, when the second holding member interferes with the first holding member, an impact between the lens units is absorbed by displacement of a biasing member is disclosed.

Japanese Patent Application Laid-Open No. 2017-227825 discloses a method of changing control of a stepping motor serving as a driving unit in order to prevent a feedback control from becoming unstable when a biasing member is displaced. Specifically, a method is disclosed in which a control deviation between a position detection value detected by a rotation detection sensor of the stepping motor and a control instruction value exceeds a reference level, and a direction of a change in a voltage applied to the stepping motor is limited when an inversion of a change direction of the control deviation is detected.

In a configuration in which a lens unit that moves by manual or external driving means is moved into a movement range of a lens unit that moves by using an electric driving means as described above, a retraction structure using a biasing member is adopted as in Japanese Patent Application Laid-Open No. 2008-197617 and Japanese Patent Application Laid-Open No. 2017-227825. On the other hand, Japanese Patent Application Laid-Open No. 2008-197617 and Japanese Patent Application Laid-Open No. 2017-227825 disclose a configuration in which a lens unit is moved without a retraction structure.

Japanese Patent Application Laid-Open No. 2017-227825 discloses that a change caused by a collision is detected from rotation of a stepping motor to change control. The collision occurs when a lens unit moved by manual or external driving means follows a lens unit moved by electric driving means, and it is desirable to avoid the collision as much as possible. From this viewpoint, Japanese Patent Application Laid-Open No. 2017-227825 relates to a control change after a collision, and a problem remains from the viewpoint of avoiding a collision as much as possible.

SUMMARY OF THE INVENTION

Accordingly, the present disclosure provides a lens apparatus that realizes high-precision driving and high-quality images while being small in size.

The present disclosure provides a lens apparatus that includes a first holding member configured to hold a first lens unit and be movable, manually or by an external driving unit, in an optical axis direction, a second holding member configured to hold a second lens unit and be electrically driven to move in the optical axis direction, a transmission member supported by the second holding member to be movable in a first range in the optical axis direction with respect to the second holding member, a driving unit configured to move the second holding member in the optical axis direction via the transmission member; a biasing member configured to bias the transmission member toward an end of the first range opposite to the first lens unit, a controller configured to control the driving unit; and a obtaining unit configured to obtain a position of the driving unit. A movable range of the first holding member in the optical axis direction and a movable range of the second holding member in the optical axis direction overlap each other. The controller determines a relative position between the driving unit and the second holding member in the optical axis direction, and changes a control of the driving unit based on the relative position.

According to the present disclosure, it is possible to provide a lens device that realizes high-precision driving and high-quality images while being small in size.

Further features of the present disclosure will become apparent from the following description of exemplary embodiments with reference to the attached drawings.

BRIEF DESCRIPTION OF THE DRAWINGS

FIG. 2 is a cross-sectional view showing a state of focusing at close distance at the wide angle end of the lens barrel according to the embodiment.

FIG. 11 is a perspective view showing a normal state of a focus unit.

DESCRIPTION OF THE EMBODIMENTS

Hereinafter, embodiments of a lens apparatus according to the present disclosure will be described in detail with reference to the accompanying drawings.

Embodiments

Hereinafter, a lens apparatus according to an embodiment of the present disclosure will be described.

Figure 1:
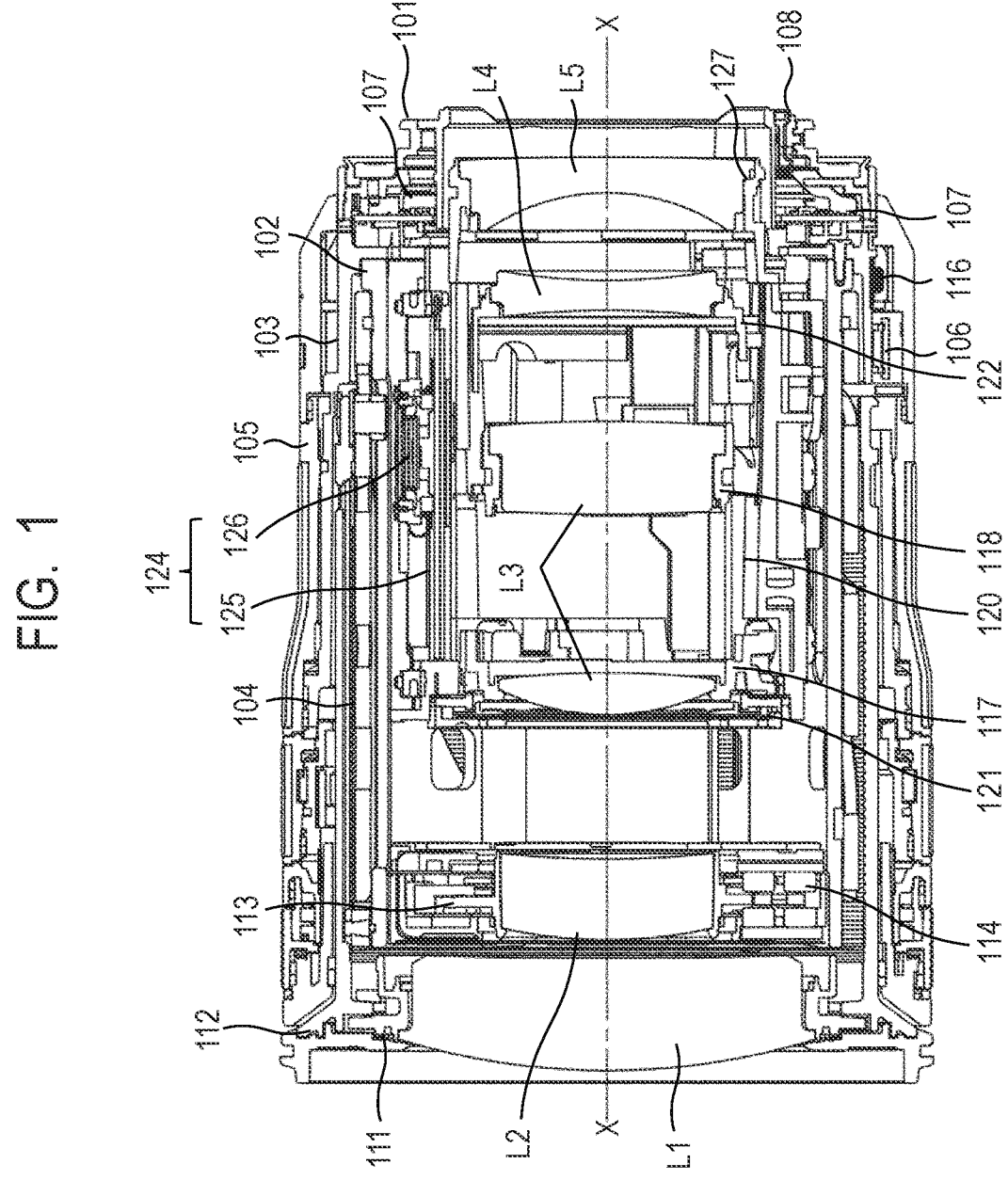
FIG. 1 is a cross-sectional view showing a state of focusing at infinity at a wide angle end of a lens barrel according to an embodiment of the present disclosure.
Figure 2:
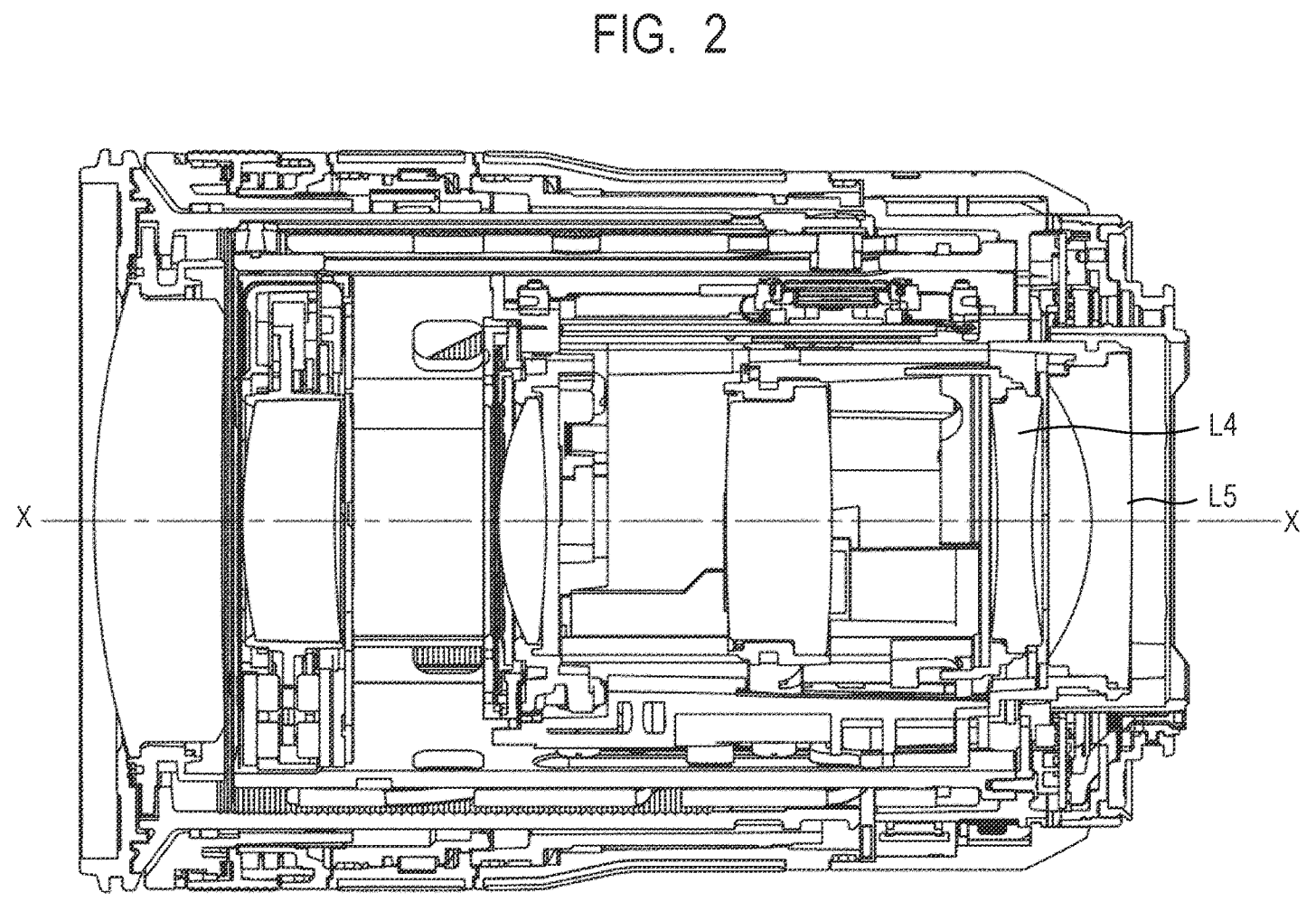
Figure 3:
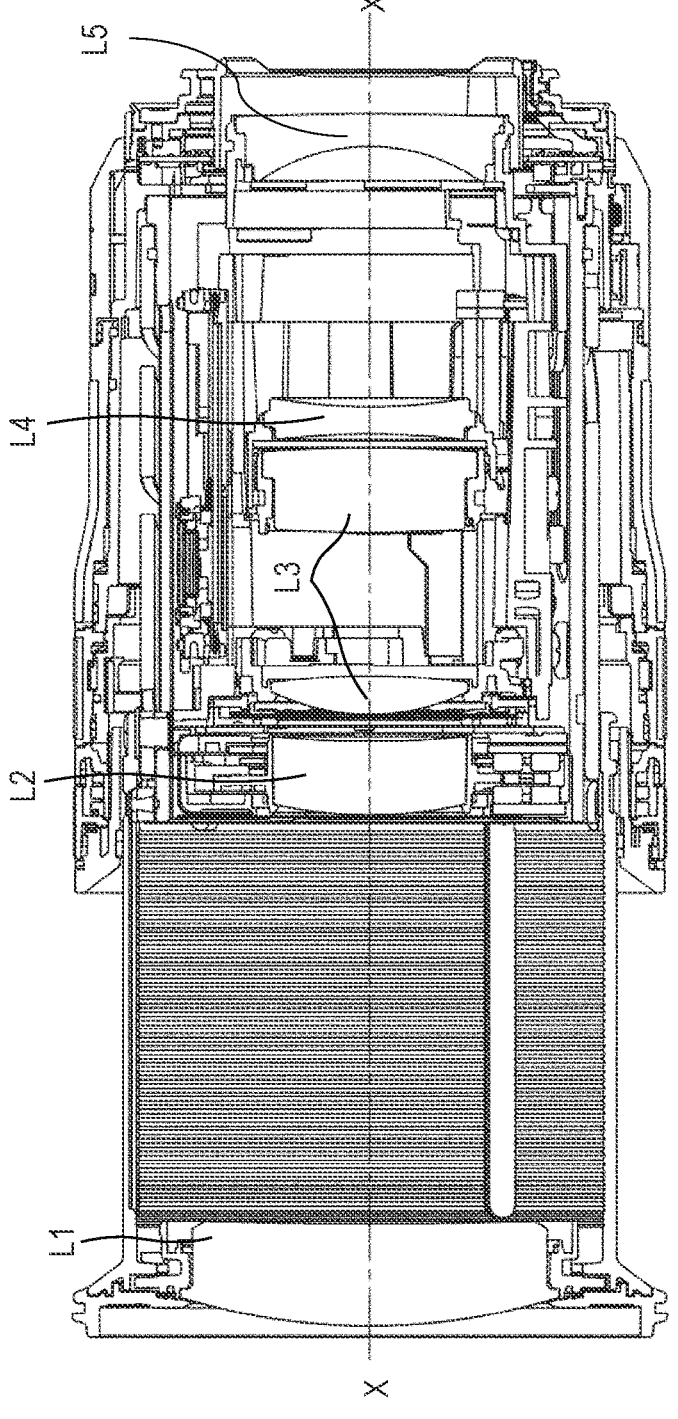
FIG. 3 is a cross-sectional view showing a state of focusing at infinity at a telephoto end of the lens barrel according to the embodiment.
Figure 4:
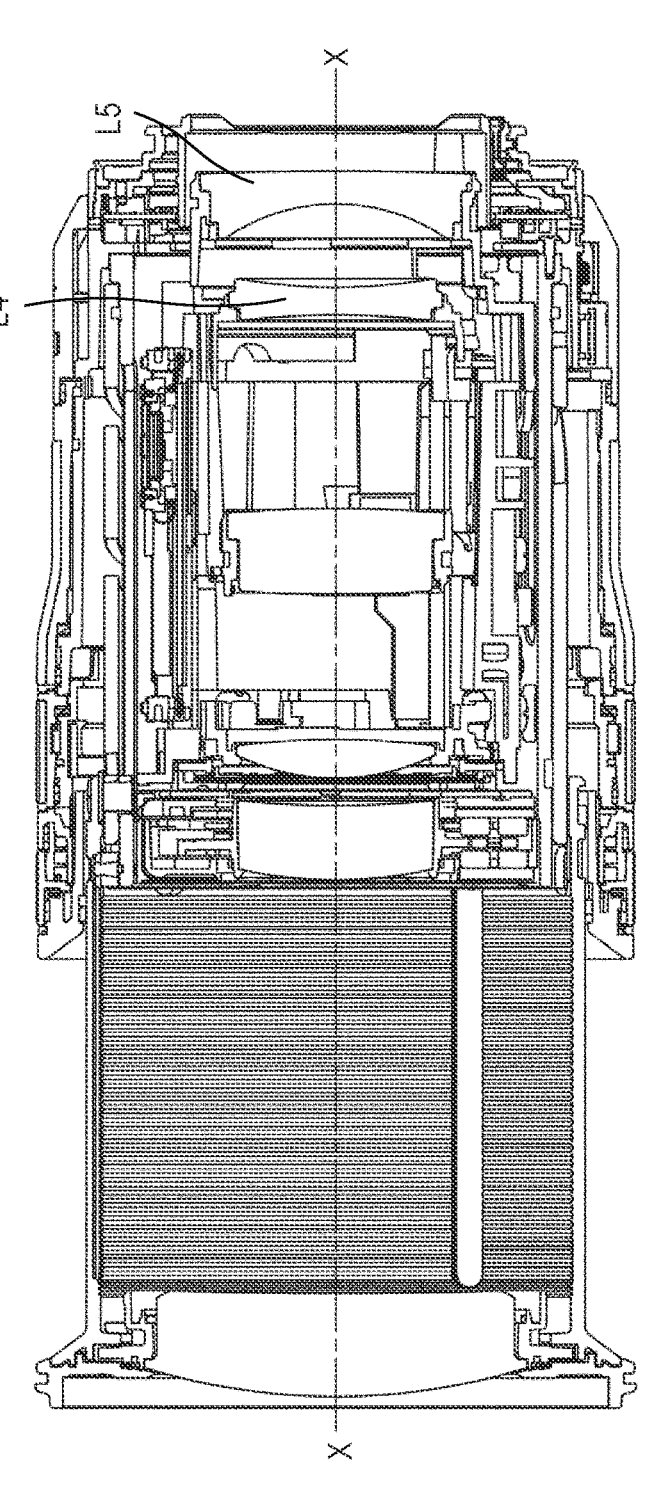
FIG. 4 is a cross-sectional view showing a state of focusing at close distance at the telephoto end of the lens barrel according to the embodiment.

FIG. 1 is a cross-sectional view showing a state of focusing at infinity at a wide angle end of the lens apparatus according to an embodiment. FIG. 2 is a cross-sectional view showing a state of focusing at close distance at the wide angle end of the lens apparatus of the embodiment. FIG. 3 is a cross-sectional view showing a state of focusing at infinity at the telephoto end of the lens apparatus according to the embodiment. FIG. 4 is a cross-sectional view showing a state of focusing at close distance at the telephoto end of the lens apparatus of the embodiment. In the figure, a line indicated by X-X represents an optical axis.

In FIG. 1, a mount 101 is a member to be fixed to a camera body (not shown). A guide barrel 102 is integrally fixed to the mount 101 together with a fixed barrel 103. A cam ring 104 is rotatably held around the optical axis on an outer periphery of the guide barrel 102. The cam ring 104 is connected to a zoom ring 105 rotatably held on an outer periphery of the fixed barrel 103 by a key member (not shown). The cam ring 104 is configured to rotate integrally with the zoom ring 105 by operating the zoom ring 105 by manual operation or external driving means. A zoom sensor (first obtaining unit) 106 is attached to the fixed barrel 103 and electrically detects a rotation angle of the zoom ring 105. The zoom sensor 106 is electrically connected to a control board (controller) 107 disposed in the vicinity of the mount 101, and transmits focal length (first optical characteristic) information during zooming to a control circuit of the control board 107. The control board 107 is electrically connected to a contact block 108, communicates with the camera body (not shown) and receives a supply of power.

The first lens unit L1 is fixed to the first lens barrel 111, and the first lens barrel 111 is fixed to a rectilinear barrel 112.

A second lens unit L2 is held by the second lens barrel 113. The second lens barrel 113 is held by a shift unit 114 so as to be movable in a plane orthogonal to the optical axis. The shift unit 114 includes an actuator for driving the second lens barrel 113, a sensor for detecting a driving amount, and the like. The shift unit 114 is fixed to the guide barrel 102 and electrically connected to the control board 107. The control board 107 controls the driving of the second lens barrel 113 so as to correct a shake based on a shake signal detected by an acceleration sensor 116 attached to the fixed barrel 103.

The third lens unit L3 is held by a 3A lens barrel 117 and a 3B lens barrel 118, and both the 3A lens barrel 117 and the 3B lens barrel 118 are fixed to the third lens base barrel 120. The third lens base barrel 120 holds an electromagnetic aperture unit 121, and the electromagnetic aperture unit 121 is electrically connected to the control board 107.

The fourth lens unit (the second lens unit) L4 is held by the fourth lens barrel (second holding member) 122, and the fourth lens barrel 122 is held by a later-described guide bar 123 (123*a*, 123*b*) so as to be movable in the optical axis direction relative to the third lens base barrel 120. The fourth lens unit L4 is a lens for focus adjustment (for focusing distance adjustment), and is driven in the optical axis direction by a linear ultrasonic motor 124 held by the third lens base barrel 120 to change the focusing distance (second optical characteristic).

The linear ultrasonic motor 124 includes a fixed portion 125 and a movable portion 126, and drives the movable portion 126 in the optical axis direction by ultrasonically vibrating a piezoelectric element, which is based on a well-known technology. The piezoelectric element is electrically connected to the control board 107 by a flexible printed circuit board (not shown).

The fifth lens unit (the first lens unit) L5 is held by the fifth lens barrel (first holding member) 127.

The first lens unit L1, the third lens unit L3, and the fifth lens unit L5 are lens units which are moved by zooming. The rectilinear barrel 112, the third lens base barrel 120, and the fifth lens barrel 127 are provided with cam followers (not shown). Each cam follower engages with a straight groove provided in the guide barrel 102 and a cam groove provided in the cam ring 104, and by rotating the cam ring 104, the first lens unit L1, the third lens unit L3, and the fifth lens unit L5 are moved straight in the optical axis direction.

Since the fourth lens unit L4 for focus adjustment is held by the third lens base barrel 120, the fourth lens unit L4 is driven in the optical axis direction by the linear ultrasonic motor 124 while moving together with the third lens base barrel 120 during zooming.

Figure 5:
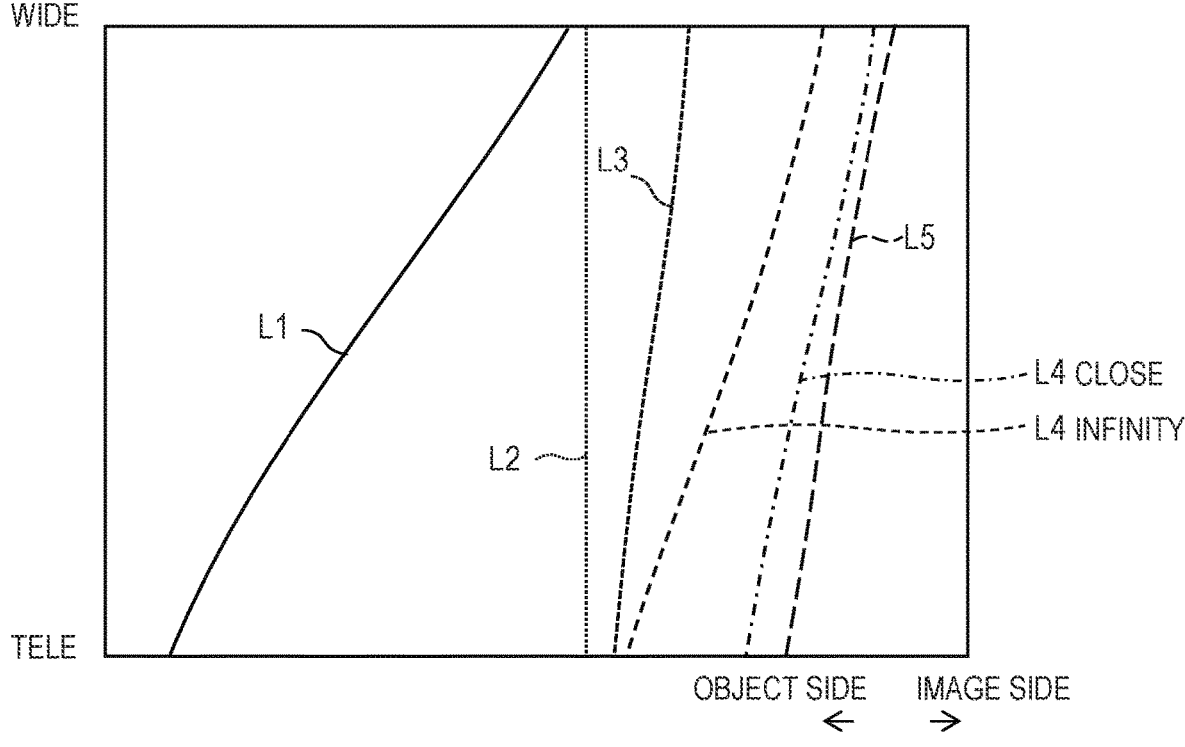
FIG. 5 is a diagram showing movement loci of lens units during zooming.

FIG. 5 is a diagram showing movement loci of lens units during zooming.

Movement loci from the wide angle end to the telephoto end are shown. It is shown that the first lens unit L1, the third lens unit L3, and the fifth lens unit L5 are moved in zooming, and the second lens unit L2 is not moved for zooming. A locus with a reference symbol L4 infinity denotes a movement locus of the fourth lens unit L4 in a state of being focused at infinity, and a locus with a reference symbol L4 close denotes a movement locus of the fourth lens unit L4 in a state of being focused at a predetermined close distance. FIG. 5 shows movement loci of the respective barrels with the fixed barrel 103 being a reference when a thickness (thickness from the closest portion to the adjacent lens unit on the image side to the closest portion to the adjacent lens unit on the object side) of each lens unit in the optical axis direction is zero.

At the time of zooming, positional information (focus position information, optical information) of the fourth lens unit L4 configured to move for focusing on each focus position from infinity to the closest focus position at each focal length from the wide angle end to the telephoto end is stored as data. Based on the information and the focal length information detected by the zoom sensor 106, the linear ultrasonic motor 124 controls the driving of the fourth lens barrel 122 so as to follow the line shown in FIG. 5.

Next, the holding structure of the fourth lens barrel 122 will be described.

Figure 6:
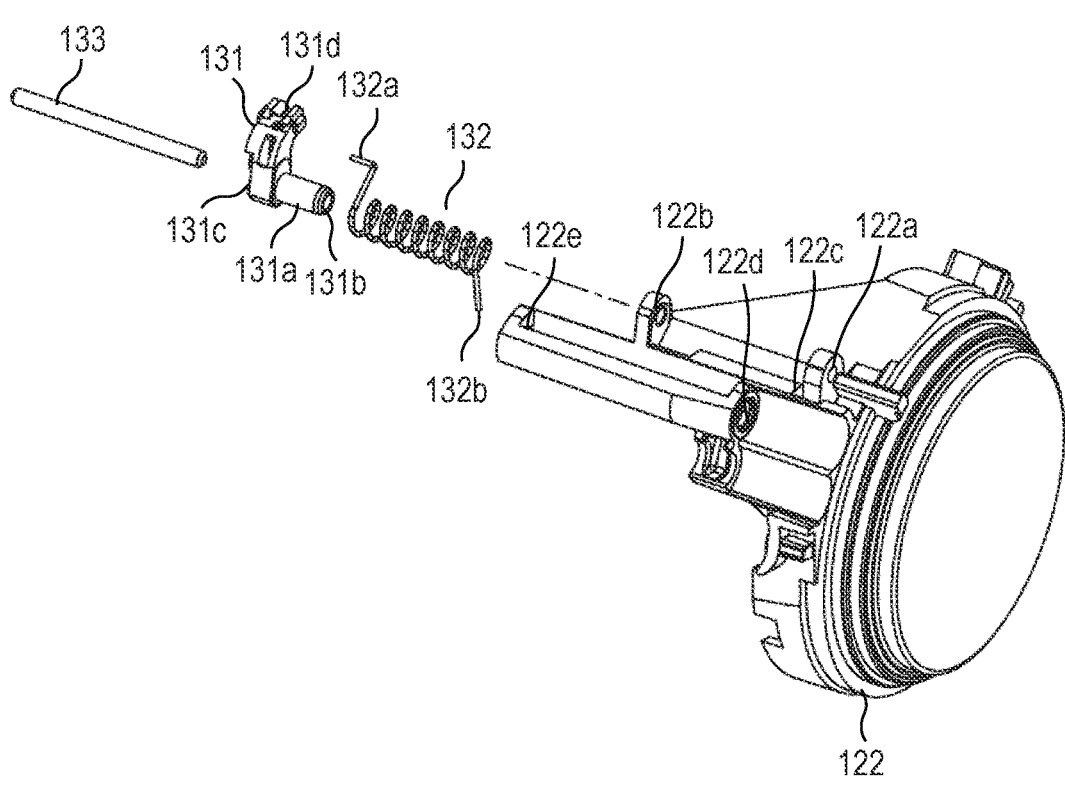
FIG. 6 is an exploded perspective view showing a structure of a rack holding portion of the fourth lens barrel.
Figure 7:
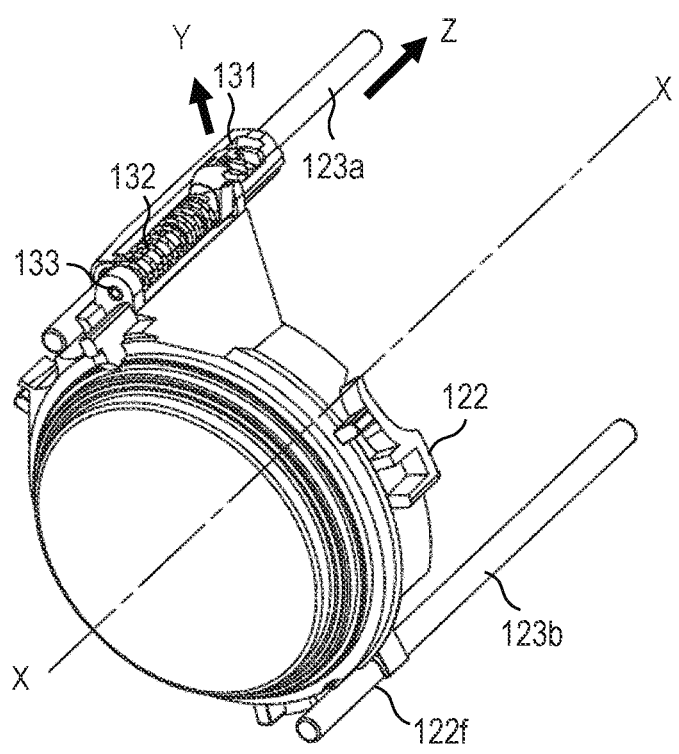
FIG. 7 is a perspective view showing a state in which a rack is assembled to the fourth lens barrel.

FIG. 6 is an exploded perspective view showing a structure of a rack holding portion of the fourth lens barrel. FIG. 7 is a perspective view showing a state in which a rack is assembled in the fourth lens barrel.

As shown in FIGS. 6 and 7, the rack (transmission member) 131 is inserted between the rack shaft holes 122*a* and 122*b* of the fourth lens barrel 122 in a state where the shaft portion 131*a* of the rack 131 is inserted through a rack spring (urging member, elastic member) 132. A rack guide shaft 133 is assembled to penetrate through the rack shaft holes 122*a* and 122*b* and a sliding hole 131*b* of the rack 131.

The rack guide shaft 133 is fixed to the fourth lens barrel 122 without rattling by press-fitting an end portion of the rack guide shaft 133 into the rack shaft hole 122a. From the above, the rack 131 is movable in the optical axis direction within a range (first range) defined by an interval between the rack shaft holes 122a and 122b with respect to the rack guide shaft 133, and is rotatably supported around the axis of the rack guide shaft 133.

At this time, the rack 131 is always biased by a biasing force of the rack spring 132 in a Z direction (the direction opposite to the fifth lens barrel 127 side) shown in FIG. 7, which is parallel to the optical axis. Thus, in the normal state (a state in which the fourth lens barrel 122 and the fifth lens barrel 127 are not in contact with each other), an end portion 131c of the rack 131 always comes into contact with the rack shaft hole 122b side of the fourth lens barrel 122 (the end of the first range opposite to the fifth lens barrel 127 side).

Further, a hook portion 132a on one side of the rack spring 132 is hooked on the rack 131, and an extension portion 132b on the other side is inserted into a spring hook hole 122c provided in the fourth lens barrel 122. By doing so, the rack 131 is always biased in the Y direction shown in FIG. 7 about the rack guide shaft 133. In the rack 131, the V-shaped groove portion 131d at the distal end always engages with a projection portion (not shown) provided on the movable portion 126 of the linear ultrasonic motor 124. This makes it possible to transmit the driving force of the linear ultrasonic motor 124 to the fourth lens barrel 122 without rattling due to the biasing force even if there is a variation in the accuracy of the components.

Both ends of each of the guide bar 123a and the guide bar 123b shown in FIG. 7 are fixed to the third lens base barrel 120. The guide bar 123a is inserted through the sleeve hole 122d and the sleeve hole 122e provided in the fourth lens barrel 122, and holds the fourth lens barrel 122 so as to be movable in the optical axis direction. The guide bar 123b engages with the U-shaped groove 122f of the fourth lens barrel 122 to prevent the fourth lens barrel 122 from rotating around the guide bar 123a.

Next, a driving method of the focus lens according to the present embodiment will be described.

Figure 8:
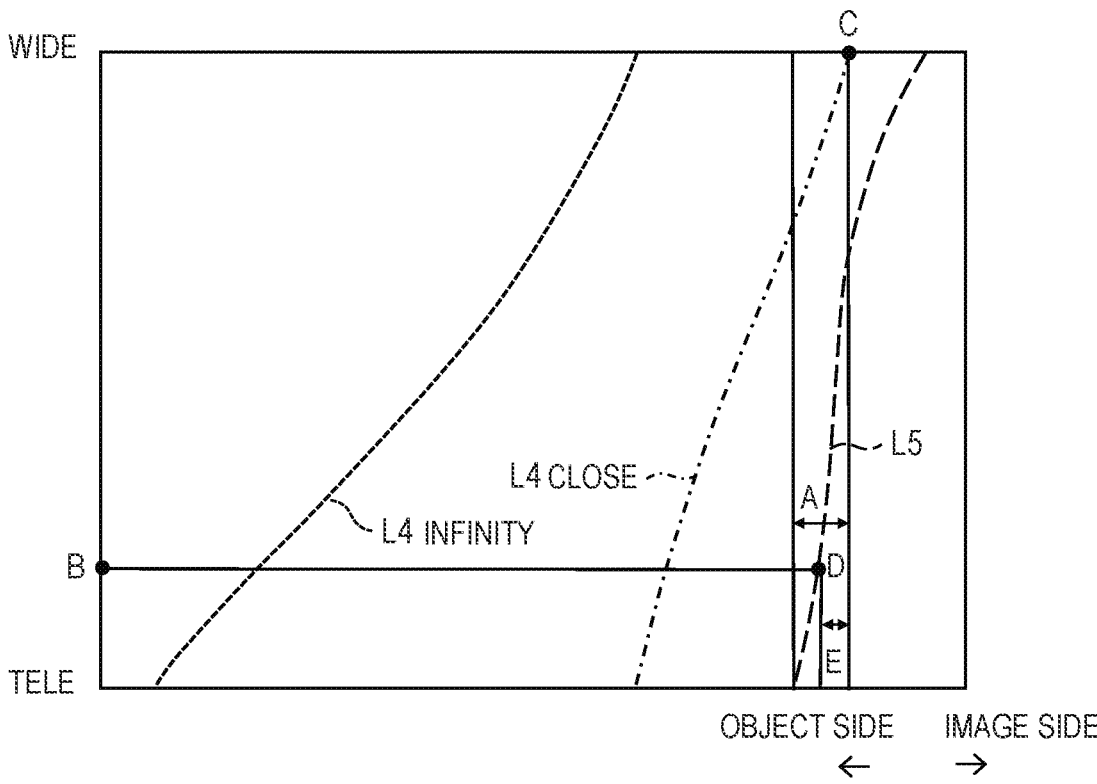
FIG. 8 is a diagram showing movement loci of the fourth lens barrel and a fifth lens barrel with respect to a third lens base barrel.

FIG. 8 is a diagram illustrating the movement loci of the fourth lens barrel 122 and the fifth lens barrel 127 at zoom positions from the wide angle end to the telephoto end with the third lens base barrel 120 as a reference (left end in the left-right direction in FIG. 8). More specifically, FIG. 8 shows the movement loci of the fourth lens barrel 122 and the fifth lens barrel 127 with respect to the third lens base barrel 120 when the thickness (thickness from the closest portion to the adjacent unit on the image side to the closest portion to the adjacent unit on the object side) of each unit in the optical axis direction is zero. Accordingly, the distance between the respective lines in the optical axis direction (the left-right direction in FIG. 8) indicates the clearance between the respective units. Further, it indicates that the lens barrels can contact each other at positions in the optical axis direction of a line (lens barrel) having a value within the same range in the optical axis direction.

The fourth lens barrel 122 holding the focus lens is driven and controlled by the linear ultrasonic motor 124 so as to follow a broken line indicated by L4 infinity in FIG. 8 when focusing at infinity by zooming. The fourth lens barrel 122 is driven and controlled so as to follow a chain line indicated by L4 close in FIG. 8 in a state of being focused at a closest distance. Although not shown in the figure as to an intermediate position from infinity to the closest distance, a locus of the fourth lens barrel 122 following from the L4 infinity to the L4 close is stored as data (optical information). The fourth lens barrel 122 is driven and controlled in accordance with the stored data based on the focal length information obtained by the zoom sensor 106.

The fourth lens barrel 122 holding the focus lens is electrically driven and controlled in accordance with zooming. However, since zooming is performed manually, a zooming operation may be performed at a high speed, and driving of the focus lens having a limit in driving speed to an appropriate position stored may not match the zooming speed.

In this lens apparatus, when the zoom lens is in the state of being focused at the closest distance at the telephoto end and the zoom lens is operated to move to the wide-angle end state at a high speed, there is a possibility that the driving of the fourth lens barrel 122 is delayed to the zooming operation and the fourth lens barrel 122 interferes (contacts) with the fifth lens barrel 127. In FIG. 8, a range in which the interference may occur is shown as an interference region A. The maximum amount of interference is the interference region A which is an amount of overlap in the optical axis direction between the position at the telephoto end of the fifth lens barrel 127 (shown in line L5) and the position at the wide angle end in the L4 close. In other words, the movable range of the fifth lens barrel 127 in the optical axis direction and the movable range of the fourth lens barrel 122 (second holding member) in the optical axis direction overlap each other in the interference region A.

In the normal image pickup state, the interference in the interference region A may be avoided due to a relationship between the zooming speed and the speed of the actuator of the focus lens. However, in a case of an application to an interchangeable lens, when the power is cut off at the wide angle end in the state of being focused at closest distance and the zoom operation is performed toward the telephoto end, the focus lens is not driven and the interference with the amount of the interference region A shown in FIG. 8 is caused.

The movement when the fifth lens barrel 127 interferes with the fourth lens barrel 122 holding the focus lens will be described.

Figure 9:
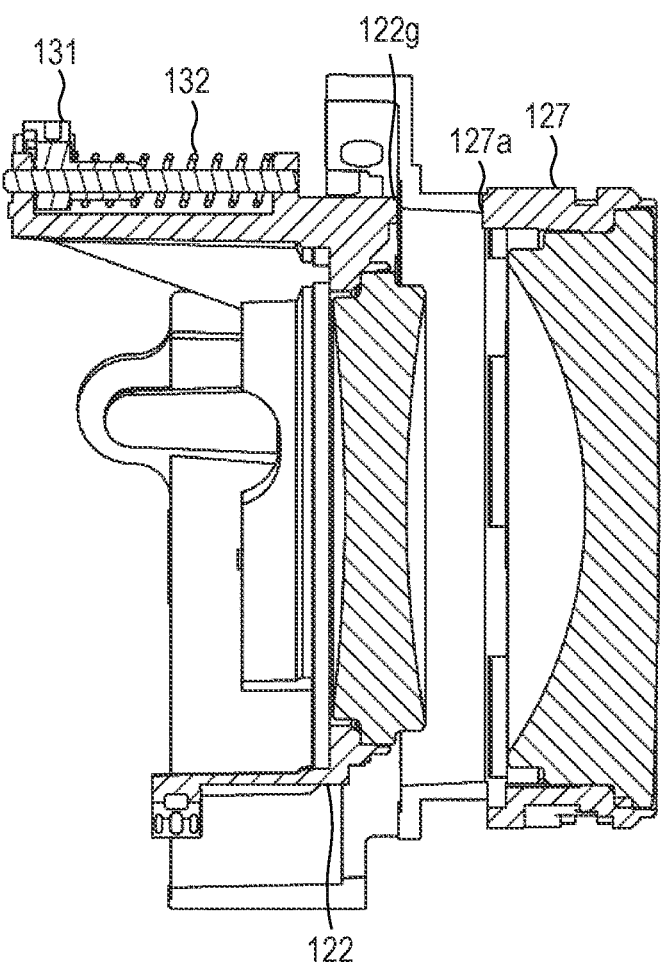
FIG. 9 is a cross-sectional view showing a normal state of the fourth lens barrel and the fifth lens barrel.
Figure 10:
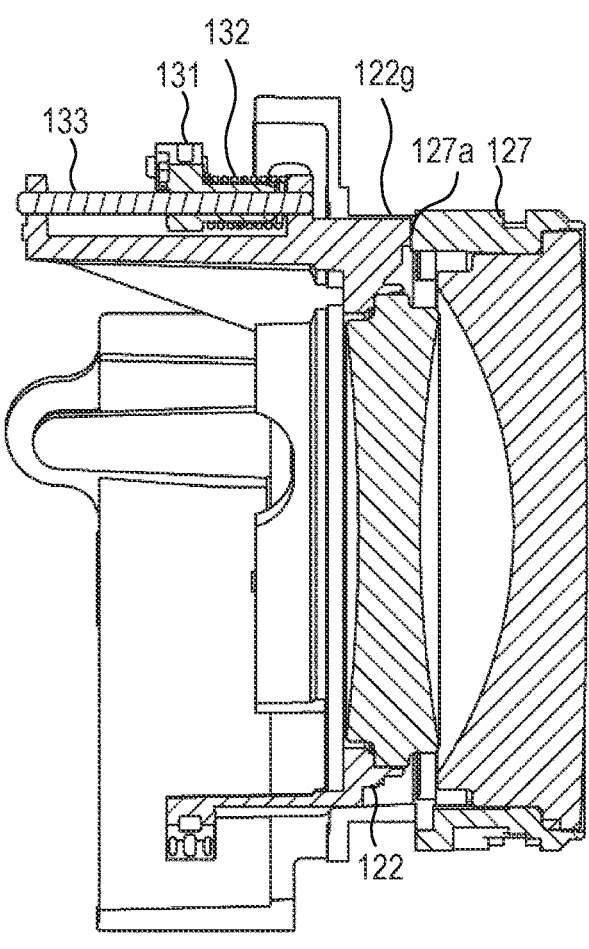
FIG. 10 is a cross-sectional view showing an interference state between the fourth lens barrel and the fifth lens barrel.

FIG. 9 is a cross-sectional view showing a normal state of the fourth lens barrel 122 and the fifth lens barrel 127, and FIG. 10 is a cross-sectional view showing the interference state.

As shown in FIG. 10, when zooming is performed at a high speed from the wide-angle end, or when zooming is performed to the telephoto end side in a state in which the power source is cut off in a state of being focused at closest end at the wide-angle end, the contact portion 122g provided on the fourth lens barrel 122 and the contact portion 127a provided at the fifth lens barrel 127 contact each other. As a result, the fourth lens barrel 122 is pushed in the optical axis direction by the fifth lens barrel 127. Then, since the rack 131 is held by the movable portion 126 of the linear ultrasonic motor 124 and cannot be moved, the rack spring 132 is compressed, the rack guide shaft 133 is slid, and the fourth lens barrel 122 is moved in the optical axis direction together with the fifth lens barrel 127. Therefore, even if the interference occurs, a damage to the lens barrels, the rack, or the motor can be prevented. When the tracking of the focus lens is completed or when the interference state is resolved by the power being turning on, an original normal state is restored by the biasing force of the rack spring 132.

In the present embodiment, the rack guide shaft 133 that holds the rack 131 movably and the guide bar 123a that guides the movement of the fourth lens barrel 122 in the optical axis direction are constituted by other components. Thereby, the distance between the sleeve hole 122*d* and the sleeve hole 122*e* for holding the guide bar 123*a* of the fourth lens barrel 122 can be made larger than that in the conventional technology using a common shaft member. As a result, the fall of the fourth lens barrel 122 can be suppressed, and the optical performance can be further improved. Further, in the fitting portion between the two holes and the guide bar, the force acting in the direction perpendicular to the shaft can be reduced, so that it is difficult to cause the twisting due to the frictional force, and smooth driving becomes possible.

Further, in the present embodiment, the rack guide shaft 133 is held by the fourth lens barrel 122 separately from the rack 131. Thus, compared to the conventional technique in which the axis of the rack member is extended back and forth in the optical axis direction, the axis of the rack member does not protrude back and forth of the lens holding member in accordance with the movement of the rack member. As a result, it is not necessary to provide unnecessary spaces back and forth of the holding portion of the rack member in the optical axis direction, and the size of the entire lens barrel can be reduced. In the prior art, it is necessary to provide a space for the interference region A in FIG. 8 back and forth of the rack holding member in the optical axis direction. Therefore, the greater the retraction amount is, the greater the effect of applying the present disclosure is.

In the conventional lens barrel, an optical design has been performed so that a driving range of the focus lens driven by the electric power does not overlap with a driving range of the other lenses. In other words, a clearance between the focus lens and the other lens unit disposed so as not to interfere with a movement range of the focus lens at the telephoto end is provided as the same amount between the focus lens and the other lens unit even at the wide angle end. Therefore, conventionally, since the amount of movement of the focus lens at the wide angle end is often smaller than that at the telephoto end, unnecessary clearance often exists in the wide angle end, and the total length of the lens becomes larger by that amount.

In the lens of the present disclosure, when zooming is performed at a high speed, interference of the focus lens is allowed, so that the unnecessary clearance between the lens units is minimized, and the entire lens barrel is made compact. In the conventional design, it is necessary to keep the distance between the lens units by the amount corresponding to the interference region A in FIG. 8, however by employing the configuration of the present disclosure, the overall length of the lens apparatus can be shortened.

On the other hand, in general, the position of the fourth lens barrel 122 holding the focus lens is detected by a position sensor provided in the fourth lens barrel 122, and feedback control in which control is performed based on a difference between a drive command position and an actual position is performed. Consider a case of an interference state where the fifth lens barrel 127 collides with the fourth lens barrel 122 when the fourth lens barrel 122 is stationary at a specific position. When the position sensor is provided in the fourth lens barrel 122, even when the linear ultrasonic motor 124 is driven in the interfering state, a state where the position of the fourth lens barrel 122 acquired from the position sensor is not changed continues. A large deviation occurs in the feedback control. In this case, there is a problem that a large thrust for driving is applied to attempt to reduce the deviation, which causes noise at the time of driving, oscillation caused by the control, and generation of sound at the time of collision due to the oscillation.

Figure 11:
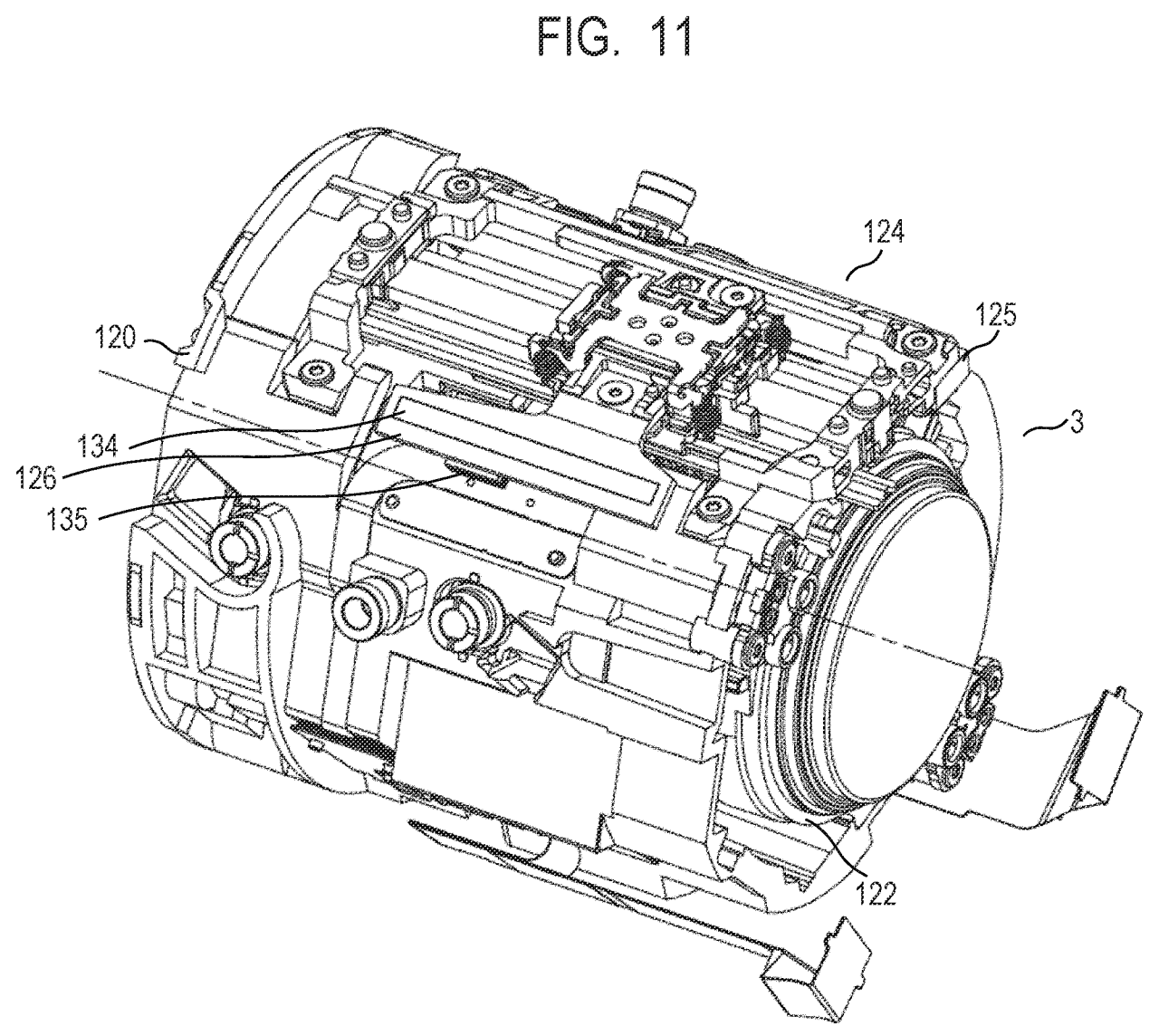

The configuration of the focus unit 3 in this embodiment will be described. FIG. 11 is a perspective view of the focus unit 3 in the normal state. The focus unit 3 includes the third lens base barrel 120, the linear ultrasonic motor 124, the position sensor 135, the 3A lens barrel 117, the 3B lens barrel 118, and the fourth lens barrel 122.

Since the description regarding the third lens base barrel 120 holding of the 3A lens barrel 117 (not shown), the 3B lens barrel 118 (not shown), and the fourth lens barrel 122 has been already made above, the description thereof is omitted.

The fixed portion 125 of the linear ultrasonic motor 124 is fixed to the third lens base barrel 120 by screws. The scale 134 is a component having a continuous pattern formed thereon in the optical axis direction. The scale 134 is bonded and fixed to the movable portion 126 of the linear ultrasonic motor 124. This pattern is read by the position sensor 135 attached to the third lens base barrel 120, and the relative position of the movable portion 126 relative to the third lens base barrel 120 in the optical axis direction is detected. In a normal state in which an interference, which will be described later, does not occur, the movable portion 126 and the fourth lens barrel 122 are movable integrally. Accordingly, in the normal state, the relative position of the fourth lens barrel 122 relative to the third lens base barrel 120 in the optical axis direction can also be detected by the position sensor 135.

Figure 12A:
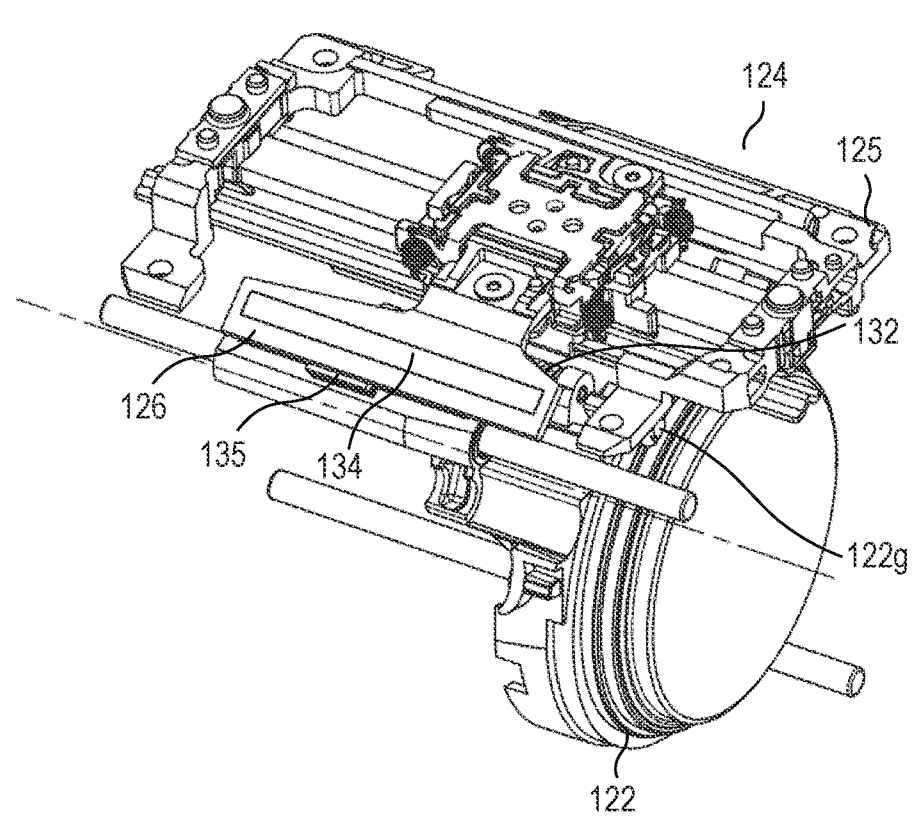
FIG. 12A is a perspective view showing a relationship among the fourth lens barrel, a focus linear actuator, and the rack in the interference state.
Figure 12B:
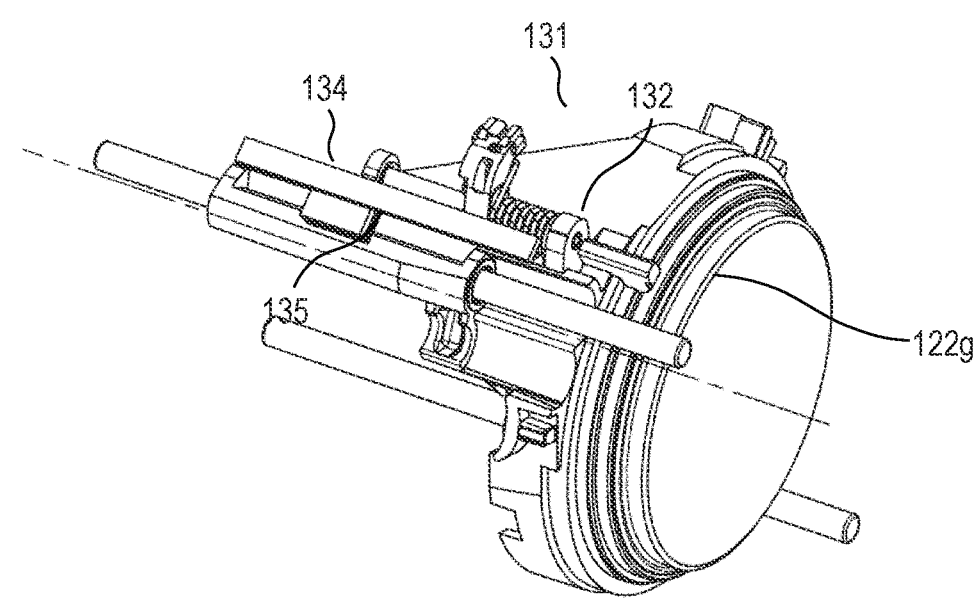
FIG. 12B is a perspective view showing a relationship among the fourth lens barrel, the focus linear actuator, and the rack in the interference state.

FIG. 12A is a perspective view showing the relationship between the fourth lens barrel 122 and the focus linear actuator in the interference state, and FIG. 12B is a perspective view showing the relationship between the fourth lens barrel 122 and the rack 131 in the interference state.

As shown in FIGS. 12A and 12B, in the interference state, the relative positions of the movable portion 126, the rack 131, and the fourth lens barrel 122 are different from those in the normal state. That is, in the interference state, the relative position of the movable portion 126 and the third lens base barrel 120 detected by the position sensor 135 and the scale 134 is different from the relative position of the fourth lens barrel 122 and the third lens base barrel 120.

In FIG. 8, the position C of the movable portion 126 of the linear ultrasonic motor 124 detected by the scale 134, the position D of L5 indicating the position of the fifth lens barrel 127 at a certain zoom position B, and the retraction amount (displacement amount) E (definition thereof will be described later) are shown.

For example, consider a case of zooming at a high speed from a state (position C) in which being focused at L4 close at the wide angle end to the zoom position B. At this time, since the fourth lens barrel 122 holding the focus lens is positioned in the interference region A, the fourth lens barrel 122 may interfere with the fifth lens barrel 127 and the fourth lens barrel 122 may be moved in the optical axis direction from the position C to the position D. When the fourth lens barrel 122 is moved to the position D due to the interference with the fifth lens barrel 127, the linear ultrasonic motor 124 and the rack 131 are not moved and only the fourth lens barrel 122 is moved. Here, the amount by which the fourth lens barrel 122 is moved by interfering with the fifth lens barrel 127 is defined as a retraction amount E. On the other hand, the position C of the movable portion 126 of the linear ultrasonic motor 124 detected by the scale 134 does not change.

When the fifth lens barrel 127 contacts with the fourth lens barrel 122 and further presses the fourth lens barrel 122 to compress the rack spring 132, the displacement amount of the rack 131 from the end opposite to the fifth lens barrel 127 in the range (first range) defined by the rack shaft holes 122*a* and 122*b* is the retraction amount E.

Here, in the present embodiment, in addition to a locus between the wide-angle end and the telephoto end between L4 infinity and L4 close, a locus L5 between the wide-angle end and the telephoto end is stored as focus position information (optical information) in, for example, the control substrate (storage unit) 107. The zoom position B is detected by the zoom sensor 106 as described above. The position D of the fifth lens barrel 127 can be specified from the information of the focus position information including the locus L5 traced by the fifth lens barrel 127 and the zoom position B detected by the zoom sensor 106. When the position of the movable portion 126 of the linear ultrasonic motor 124 detected by the scale 134 is the position C, the retraction amount E of the fourth lens barrel 122 can be calculated as a difference amount between the position C and the position D.

Here, the movement lines of the respective lens barrels shown in FIGS. 5 and 8 are drawn with the position of the third lens base barrel 120 that moves during zooming being as a reference. The position of the movable portion 126 detected by the scale 134 and the position sensor 135 (second obtaining means) is measured as the position relative to the third lens base barrel 120. When deriving the retraction amount E of the fourth lens barrel 122 based on the position C and the position D, the reference of the position in the optical axis direction may be derived with the third lens base barrel 120 as a reference or with the fixed barrel 103 as a reference. In any case, the retraction amount E is derived by the control board (relative position obtaining means) 107 based on the in-focus position information (optical information) stored in advance, the detected zoom position, and the information on the position of the movable portion 126 detected by the scale 134.

When the position on the object side is defined as '+' and the position on the image side is defined as '−', and in this embodiment, the relationship of the position D>the position C is satisfied, the fourth lens barrel 122 interferes with the fifth lens barrel 127, and it can be determined that the fourth lens barrel 122 is retracted by compressing the rack spring 132 from the normal state by the retraction amount E. On the contrary, when the relationship of the position D<the position C is satisfied, it can be determined that the fourth lens barrel 122 is in the normal state without interfering with the fifth lens barrel 127.

When it is determined that the state is the normal state, for example, the retraction amount E is uniformly 0. When the retraction state (interference state) is determined, a drive command is sent to the linear ultrasonic motor 124 so as to satisfy that the position D<the position C, based on the information of the retraction amount E, so that the retraction amount E becomes 0.

Further, in the retracted state (interference state), the biasing force applied from the rack spring 132 to the fourth lens barrel 122 and the movable portion 126 in the Z direction changes according to the retraction amount E. Therefore, it is preferable to change a control parameter such as a feedback gain for the driving control of the linear ultrasonic motor 124 according to the retraction amount E. This makes it possible to control the driving of the fourth lens barrel 122 in a state in which the positional accuracy is better. Further, by increasing the driving speed (highest driving speed) and the acceleration of the linear ultrasonic motor 124 according to the retraction amount E, it is possible to quickly return to the normal state while suppressing a decrease in position accuracy and a decrease in quality such as driving sound.

In this embodiment, the scale 134 is provided on the movable portion 126 of the linear ultrasonic motor 124. Therefore, even in a configuration in which the fourth lens barrel 122 is retracted, the position deviation does not increase during the drive control, and an oscillation due to the position deviation does not occur.

Although the case where zooming is performed at high speed has been described so far, even when the power source is cut off in the state of being focused at closest distance at the wide-angle end and is zoomed toward the telephoto end to be in the retracted state (interference state), a rapid recovery can be achieved by the same driving control by turning on the power again.

According to the present embodiment, it is possible to reduce the size of the entire lens apparatus, suppress oscillation, and suppress generation of sound or driving sound at the time of collision due to oscillation.

Although the scale 134 is provided on the movable portion 126 of the linear ultrasonic motor 124 in the present embodiment, the present disclosure is not limited thereto. It may be provided in the rack 131 that moves integrally with the movable portion 126.

Further, in this embodiment, an ultrasonic motor is used to drive the focus lens, but the same effect can be obtained by employing a driving means such as a step motor.

Figure 13:
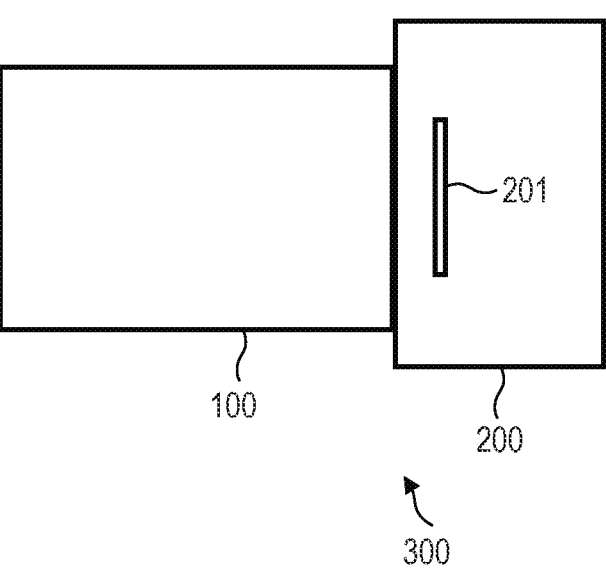
FIG. 13 is a diagram showing an image pickup apparatus having a lens apparatus of the present disclosure.

An image pickup apparatus 300 (FIG. 13) including the lens apparatus 100 of the embodiment and a camera apparatus 200 having the image pickup element 201 for picking up an image formed by the lens apparatus 100 can realize an image pickup apparatus that enjoys the effect of the present disclosure.

Although the embodiments have been described with respect to interchangeable lenses for still image shooting and moving image shooting, there is a possibility that the same effect can be obtained when manual zooming is performed in a lens barrel for recording images. Further, the present disclosure can be applied not only to a focus lens in a lens barrel, but also to a lens which moves by other zoom, or a case where the lens barrel is miniaturized by contact with a fixed portion.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-041679, filed Mar. 16, 2022, which is hereby incorporated by reference herein in its entirety.

What is claimed is:

1. A lens apparatus comprising:
a first holding member configured to hold a first lens unit and be movable, manually or by an external driving unit, in an optical axis direction;
a second holding member configured to hold a second lens unit and be electrically driven to move in the optical axis direction;
a transmission member supported by the second holding member to be movable in a first range in the optical axis direction with respect to the second holding member;
a driving unit configured to move the second holding member in the optical axis direction via the transmission member;
a biasing member configured to bias the transmission member toward an end of the first range opposite to the first lens unit;
a controller configured to control the driving unit; and
an obtaining unit configured to obtain a position of the driving unit,
wherein a movable range of the first holding member in the optical axis direction and a movable range of the second holding member in the optical axis direction overlap each other,
wherein the controller determines a relative position between the driving unit and the second holding member in the optical axis direction, and changes a control of the driving unit based on the relative position.

2. The lens apparatus according to claim 1, wherein the relative position is a displacement amount of the transmission member from the end.

3. The lens apparatus according to claim 2, wherein the controller changes at least one of a driving speed, an acceleration, or a voltage of the driving unit based on the displacement amount.

4. The lens apparatus according to claim 2, wherein when the displacement amount is larger than 0, the controller controls the driving unit to move the transmission member in a direction away from the first holding member so that the displacement amount becomes 0.

5. The lens apparatus according to claim 2, wherein when the displacement amount is larger than 0, the controller controls the driving unit at a driving speed higher than that when the displacement amount is 0.

6. The lens apparatus according to claim 2, wherein when the displacement amount is larger than 0, the controller controls the driving unit with a feedback gain different from that in a case where the displacement amount is 0.

7. The lens apparatus according to claim 1, wherein the first lens unit moves in the optical axis direction when a first optical characteristic is changed, and the second lens unit moves in the optical axis direction when the first optical characteristic and a second optical characteristic are changed.

8. The lens apparatus according to claim 7,
wherein a storage unit configured to store an optical information on a position of the first holding member in the optical axis direction relative to the first optical characteristic;
a first obtaining unit configured to obtain the first optical characteristic; and
a second obtaining unit configured to obtain a position of the transmission member in the optical axis direction,
wherein the controller obtains the displacement amount based on the optical information stored in the storage unit, the first optical characteristic obtained by the first obtaining unit, and the position of the transmission member in the optical axis direction obtained by the second obtaining unit.

9. The lens apparatus according to claim 7, wherein the first optical characteristic is a focal length, and the second optical characteristic is a focusing distance.

10. The lens apparatus according to claim 8, wherein the optical information includes an information related to a position of the second holding member in the optical axis direction with respect to the first optical characteristic and the second optical characteristic.

11. An image pickup apparatus comprising;
a lens apparatus; and
an image pickup element configured to pick up an image formed by the lens apparatus,
wherein the lens apparatus comprises:
a first holding member configured to hold a first lens unit and be movable, manually or by an external driving unit, in an optical axis direction;
a second holding member configured to hold a second lens unit and be electrically driven to move in the optical axis direction;
a transmission member supported by the second holding member to be movable in a first range in the optical axis direction with respect to the second holding member;
a driving unit configured to move the second holding member in the optical axis direction via the transmission member;
a biasing member configured to bias the transmission member toward an end of the first range opposite to the first lens unit;
a controller configured to control the driving unit; and
an obtaining unit configured to obtain a position of the driving unit,
wherein a movable range of the first holding member in the optical axis direction and a movable range of the second holding member in the optical axis direction overlap each other,
wherein the controller determines a relative position between the driving unit and the second holding member in the optical axis direction, and changes a control of the driving unit based on the relative position.

* * * * *